US009670003B2

(12) United States Patent
Ferguson

(10) Patent No.: US 9,670,003 B2
(45) Date of Patent: Jun. 6, 2017

(54) SNUB IDLER FOR CONVEYOR

(71) Applicant: Richwood Industries, Inc., Huntington, WV (US)

(72) Inventor: Cecil James Ferguson, Proctorville, OH (US)

(*) Notice: Subject to any disclaimer, the term of this patent is extended or adjusted under 35 U.S.C. 154(b) by 0 days.

(21) Appl. No.: 15/160,104

(22) Filed: May 20, 2016

(65) Prior Publication Data

US 2016/0340127 A1 Nov. 24, 2016

Related U.S. Application Data

(60) Provisional application No. 62/165,589, filed on May 22, 2015.

(51) Int. Cl.
| | |
|---|---|
| *B65G 15/08* | (2006.01) |
| *B65G 39/12* | (2006.01) |
| *B65G 39/16* | (2006.01) |

(52) U.S. Cl.
CPC .............. *B65G 39/12* (2013.01); *B65G 15/08* (2013.01); *B65G 39/16* (2013.01)

(58) Field of Classification Search
CPC ........ B65G 39/12; B65G 39/16; B65G 15/08; B65G 39/125; B65G 15/60; B65G 15/62
USPC ....... 198/818, 824, 825, 826, 828, 829, 830, 198/837
See application file for complete search history.

(56) References Cited

U.S. PATENT DOCUMENTS

| | | | | |
|---|---|---|---|---|
| 1,773,621 | A * | 8/1930 | Hopkinson | ............ B65G 39/10 198/825 |
| 3,756,369 | A * | 9/1973 | Hulette | .................. B65G 65/06 198/511 |

(Continued)

*Primary Examiner* — Mark A Deuble
(74) *Attorney, Agent, or Firm* — Dinsmore & Shohl LLP; Monika L'Orsa Jaensson, Esq.

(57) ABSTRACT

Disclosed is technology including a snub idler for a conveyor having a plurality of rollers and a frame comprising means to support the plurality of rollers in a convex or similar shape. The means to support the plurality of rollers in a convex shape may include a pair of convex arcuate or similar rails respectively affixed to a side panel of the frame. The present technology also includes a conveyor including a tail pulley, an impact load bed defining a trough and having a concave shape, and one or more snub idlers positioned between the tail pulley and the impact load bed. In this arrangement the snub idler supports a plurality of rollers having a convex or similar shape generally complementary with the concave shape of the impact load bed trough. The disclosed technology also includes a method of positioning and shaping a conveyor belt, including configuring a snub idler having a plurality of roller segments, with each roller segment having a roller, wherein the rollers define a convex or similar shape generally complementary with a concave shape of a trough defined by an impact load bed of a conveyor. This method further includes positioning the snub idler longitudinally between a tail pulley of the conveyor and the impact load bed, and supporting the snub idler with a snub idler support structure such that the roller of at least some of the roller segments of the snub idler is in contact with an upper surface of the conveyor belt and forces the conveyor belt down into the trough.

18 Claims, 12 Drawing Sheets

(56) References Cited

U.S. PATENT DOCUMENTS

| | | | | |
|---|---|---|---|---|
| 4,146,947 A * | 4/1979 | Richter | .................... | D06C 3/06 |
| | | | | 198/826 |
| 5,007,528 A * | 4/1991 | Hideharu | ................ | B65G 15/60 |
| | | | | 198/823 |
| 5,373,935 A * | 12/1994 | Anderson | .............. | B65G 39/12 |
| | | | | 198/808 |
| 6,390,289 B1 * | 5/2002 | Hoggan | ................ | B65G 15/08 |
| | | | | 198/806 |
| 6,394,262 B1 * | 5/2002 | Stoll | ...................... | B65G 39/06 |
| | | | | 198/825 |
| 6,971,508 B2 * | 12/2005 | Kotaki | ................... | B65G 15/08 |
| | | | | 198/811 |
| 7,614,493 B2 * | 11/2009 | Dowling | ................ | B65G 39/16 |
| | | | | 198/806 |
| 2011/0127145 A1 * | 6/2011 | Eriksson | ................ | B65G 39/16 |
| | | | | 198/837 |
| 2013/0146427 A1 * | 6/2013 | Greirson | ................ | B65G 15/00 |
| | | | | 198/837 |
| 2013/0277181 A1 * | 10/2013 | Kuiper | ................... | B65G 15/62 |
| | | | | 198/841 |
| 2014/0083822 A1 * | 3/2014 | Swinderman | .......... | B65G 15/60 |
| | | | | 198/827 |

* cited by examiner

SNUB IDLER FOR CONVEYOR

TECHNICAL FIELD

This application relates generally to conveyors, and more particularly, to snub idlers for conveyors.

BACKGROUND

Conveyor systems, which can include a plurality of conveyors arranged in series, are commonly used to transport bulk material, e.g., coal, or rocks and/or stones, from an extraction site, e.g., a mine or quarry, to a discharge location where the bulk material can be loaded onto vehicles for distribution. Known conveyor systems include those having an upstream conveyor positioned near the extraction site. The upstream conveyor includes an impact load bed, which defines an impact load zone, and a driven pulley commonly referred to as a head pulley. Rotation of the head pulley causes an endless conveyor belt that is coupled with the head pulley to travel in a loop, from a rotatable tail pulley through the impact load zone to the head pulley, and back to the tail pulley.

The impact load bed includes a plurality of impact idlers, each having a plurality of rollers, and/or a plurality of impact saddles, which are arranged along the length of the impact load zone. The impact idlers and/or impact saddles are configured such that they cooperate to define a generally V-shaped trough. The conveyor belt is positioned within the trough and slides across the rollers of the idlers and/or an upper surface of segments of each of the impact saddles, which are constructed from a material having a relatively low coefficient of friction, during operation of the upstream conveyor.

The conveyor belt is substantially flat, or planar, as it leaves the tail pulley. The conveyor belt transitions from this substantially flat shape to the generally V-shape of the trough, as it travels through a transition zone that extends between the tail pulley and the impact load zone. Some known conveyors are configured such that an uppermost portion of the tail pulley, from which the conveyor belt leaves, is higher than a lowest portion of the trough. Known conveyors of this type are referred to as having a partial trough transition, and the change in shape of the conveyor belt is at least partially a result of bulk material dropping onto the conveyor belt, and forcing the conveyor belt downward into the trough, as the conveyor belt travels through the impact load zone. Various parameters, such as tension in the conveyor belt, and the difference in height between the uppermost portion of the tail pulley and the lowest portion of the trough, can cause the conveyor belt to spring upward, changing the position of the conveyor belt relative to the trough.

Some known conveyors having a partial trough transition are associated with a chute. The chute is configured to permit bulk material to be dropped onto the conveyor belt, but otherwise encloses the conveyor belt. The chute may include side skirt boards, and flexible seals attached to the lower ends of the side skirt boards. The flexible seals contact the conveyor belt to prevent, or at least substantially prevent, dust or fine particles of the bulk material escaping into the surrounding atmosphere, which can be the interior of a mine, to facilitate compliance with established environmental and/ or mine safety regulations. In some instances, vertical movement of the conveyor belt during operation of the conveyor degrades the side skirt board seals, resulting in dust or fine particles of the bulk material escaping into the surrounding atmosphere.

Some known conveyors having a partial trough transition include side skirt boards that are not associated with a chute, and flexible seals that are attached to the lower ends of the side skirt boards and in contact with the conveyor belt. In some instances, vertical movement of the conveyor belt during operation of the conveyor degrades these side skirt board seals resulting in pieces of the bulk material that is being conveyed to become trapped, or lodged, under the side skirt board seals. This can cause significant damage to the conveyor belt as it moves over the trapped material.

Some conventional conveyors are configured such that an uppermost portion of the tail pulley is in the same plane as the lowermost portion of the trough. Known conveyors of this type are referred to as having a full trough transition, and are not as susceptible to vertical movement of the conveyor belt as conveyors having a partial trough transition. However, a conveyor operator can incur increased costs associated with the use of conveyors having a full trough transition, for example, but not limited to, the cost associated with the increased length of a typical conventional conveyor having a full trough transition as compared to the length of a typical conventional conveyor having a partial trough transition.

GENERAL DESCRIPTION OF THE TECHNOLOGY

The present technology overcomes many of the aforementioned disadvantages of current conveyor systems by guiding the conveyor belt from its substantially flat shape as it leaves the tail pulley to a concave shape at the trough defined by the impact load bed, as the belt travels through the transition zone. By the present advancements of technology, the lower surface of the conveyor belt is in contacting engagement with the impact idlers and impact segments of the impact load bed as the conveyor belt travels through the trough, and any upward movement of the conveyor belt is nearly eliminated. Furthermore, the present technology enables conveyors to have a partial trough transition zone, limiting the conveyor's space requirements.

The disclosed technology includes a snub idler for a conveyor having a plurality of rollers and a frame comprising means to support the plurality of rollers in a convex shape. The means to support the plurality of rollers in a convex shape may include a pair of convex arcuate or open trapezoidal rails respectively affixed to, for example, a lower surface of side panels of the frame. The rollers may be rotatably supported by roller frames, to form roller segments, which when slidably coupled with the rails or other structure of the snub idler frame, forms the desired convex shape. A support structure may be coupled with the snub idler frame to support the idler on a conveyor, above the belt.

The present technology also includes a conveyor including a conveyor belt, a tail pulley, an impact load bed defining a trough and having a concave shape, and a snub idler positioned between the tail pulley and the impact load bed. As herein described the impact load bed may include one or more impact idlers, one or more impact saddles, or a combination thereof. In the present arrangement the snub idler supports a plurality of rollers having a convex shape generally complementary with the concave shape of the impact load bed trough. Each of the tail pulley, the idlers and/or the saddles of the impact load bed and the snub idler may be supported by a conveyor support structure and independent component support structures so that the belt traverses a path above the tail pulley, below the snub idler and above the impact load bed.

The snub idler of this arrangement may include arcuate or open trapezoidal rails to support the rollers, the rails having a convex or similar shape that is also generally complementary with the concave shape of the trough. As hereinabove and hereinafter described, the rails may be attached to a frame of a snub idler, such as to the lower surface of corresponding side panels of the snub idler.

The disclosed technology further includes a method of positioning and shaping a conveyor belt, including the steps of configuring a snub idler having a plurality of roller segments, with each roller segment having a roller, wherein the rollers define a convex shape generally complementary with a concave shape of a trough defined by an impact load bed of a conveyor. This method further includes the steps of positioning the snub idler longitudinally between a tail pulley of the conveyor and the impact load bed, and supporting the snub idler with a support structure such that the roller of at least some of the roller segments of the snub idler is in contact with an upper surface of the conveyor belt and forces the conveyor belt down into the trough, with a lower surface of the conveyor belt contacting the impact load bed. The snub idler may include a frame having a pair of side panels, each side panel having a lower surface with a convex or similar shape, and a pair of arcuate or open trapezoidal rails attached to the lower surface of a side panel, each of the rails having a convex or open trapezoidal shape that is generally complementary with the concave shape of the trough. In this configuration, each of the plurality of roller segments may include a roller frame rotatably supporting a roller, wherein the roller frames are slidably coupled with the rails. In some embodiments, the distance between the tail pulley and the snub idler in the configured arrangement is greater than the distance between the snub idler and the impact load bed.

BRIEF DESCRIPTION OF THE DRAWINGS

Various embodiments will become better understood with regard to the following description, appended claims, and accompanying drawings, wherein:

DETAILED DESCRIPTION

Figure 1:
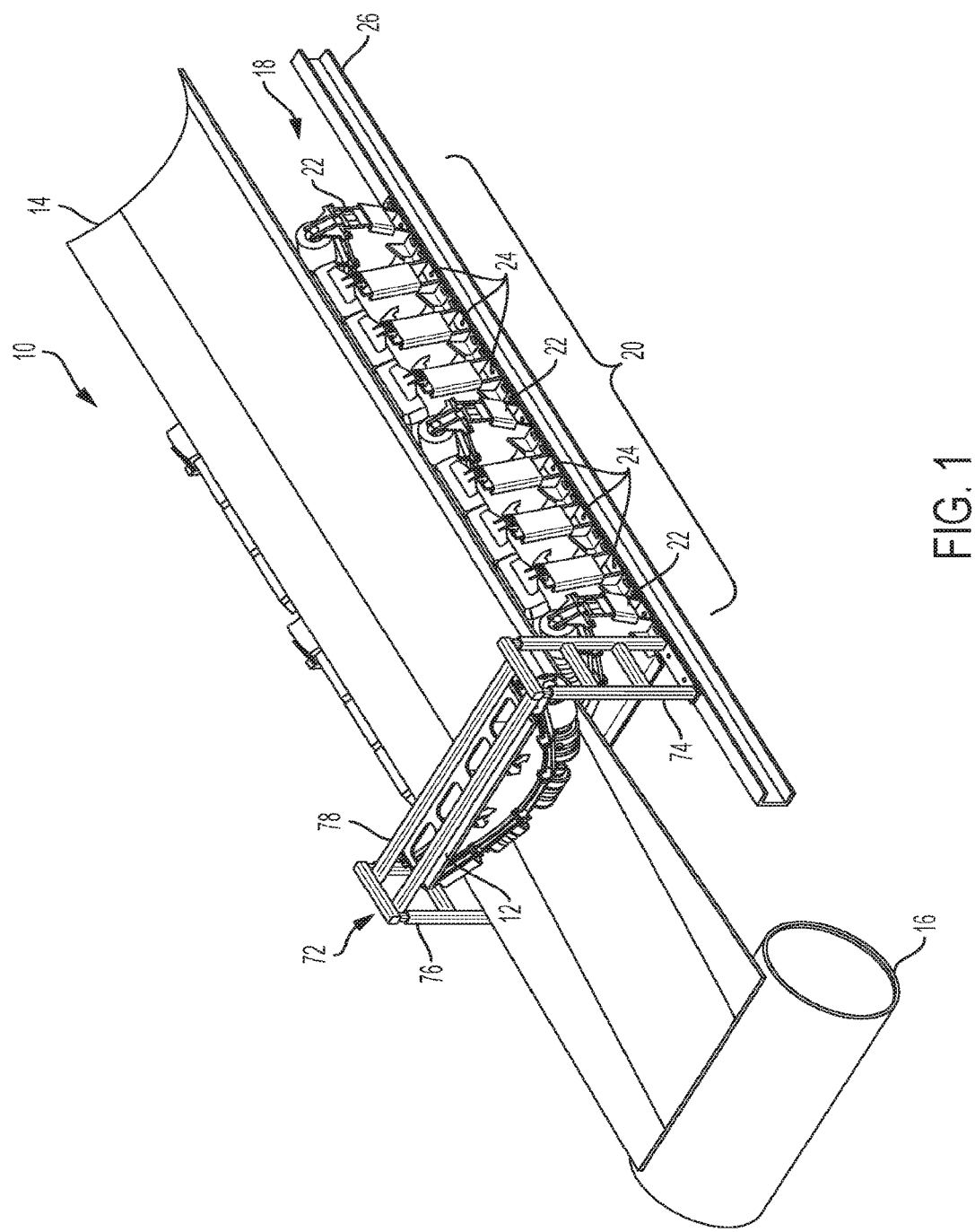
FIG. 1 is a perspective view of a conveyor according to one embodiment, which includes a snub idler according to one embodiment, with a portion of a conveyor belt, a head pulley, and a portion of a support structure of the conveyor, omitted for purposes of clarity of illustration.
Figure 2:
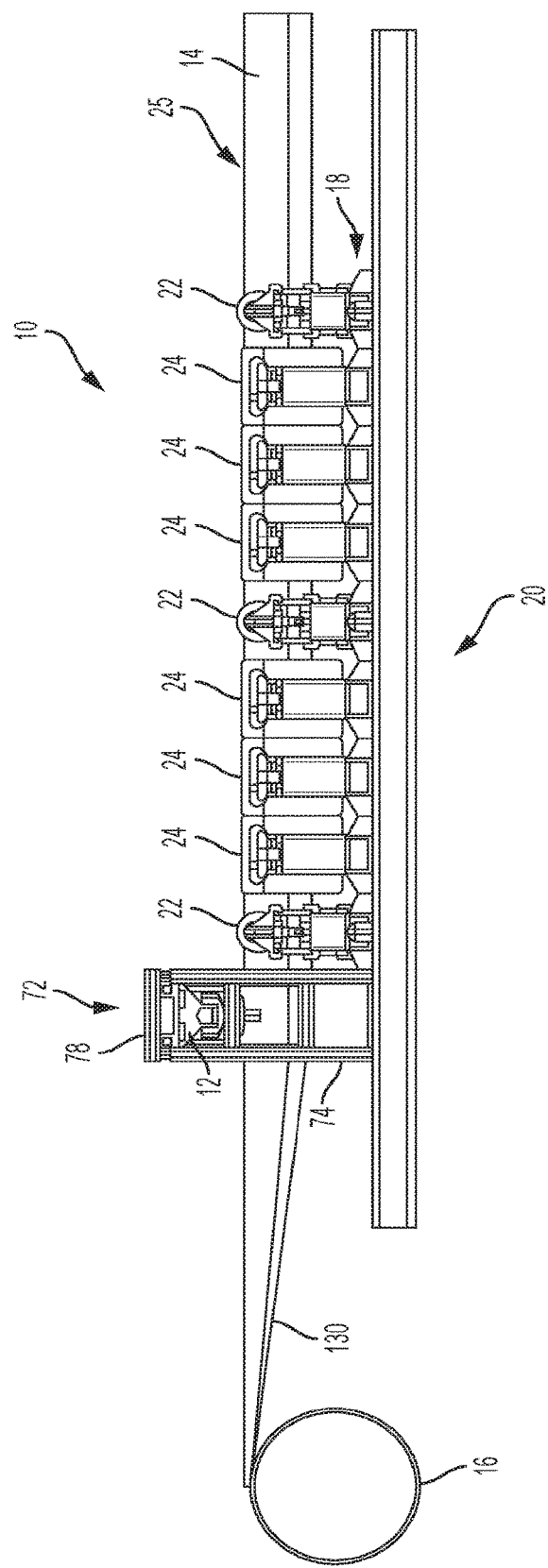
FIG. 2 is a side elevation view of the conveyor of FIG. 1.

Referring to the drawings, wherein like reference numbers indicate the same or corresponding elements throughout the drawings, FIGS. 1-4 illustrate a conveyor 10, according to one embodiment, which can include a snub idler 12, according to one embodiment. The conveyor 10 can also include a conveyor belt 14 (shown partially in FIGS. 1-4), a tail pulley 16, and a head pulley (not shown). The head pulley can be rotatably coupled with a source of motive power, e.g., an electric motor or an internal combustion engine. Conveyor 10 can also include an impact load bed 18, which can define an impact load zone 20 (FIGS. 1 and 2). Rotation of the head pulley can cause the conveyor belt 14, which can also be referred to as an endless belt or a continuous belt, to travel in a loop (not shown) from the tail pulley 16 through the impact load bed 18 and to the head pulley, and back to the tail pulley 16. The conveyor belt 14 can extend around respective portions of the outer surfaces of the tail pulley 16 and the head pulley.

Figure 3:
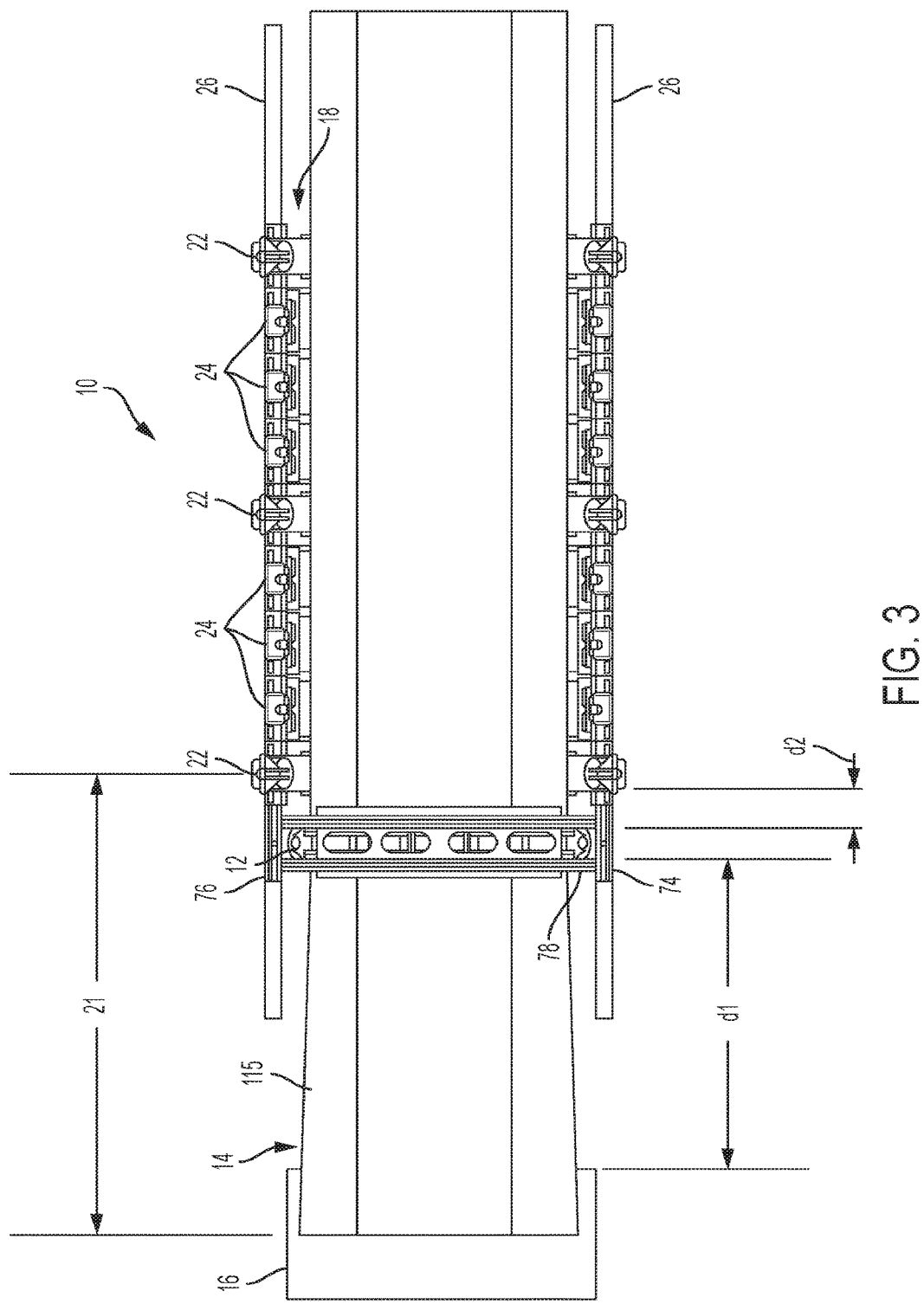
FIG. 3 is a top plan view of the conveyor of FIG. 1.
Figure 4:
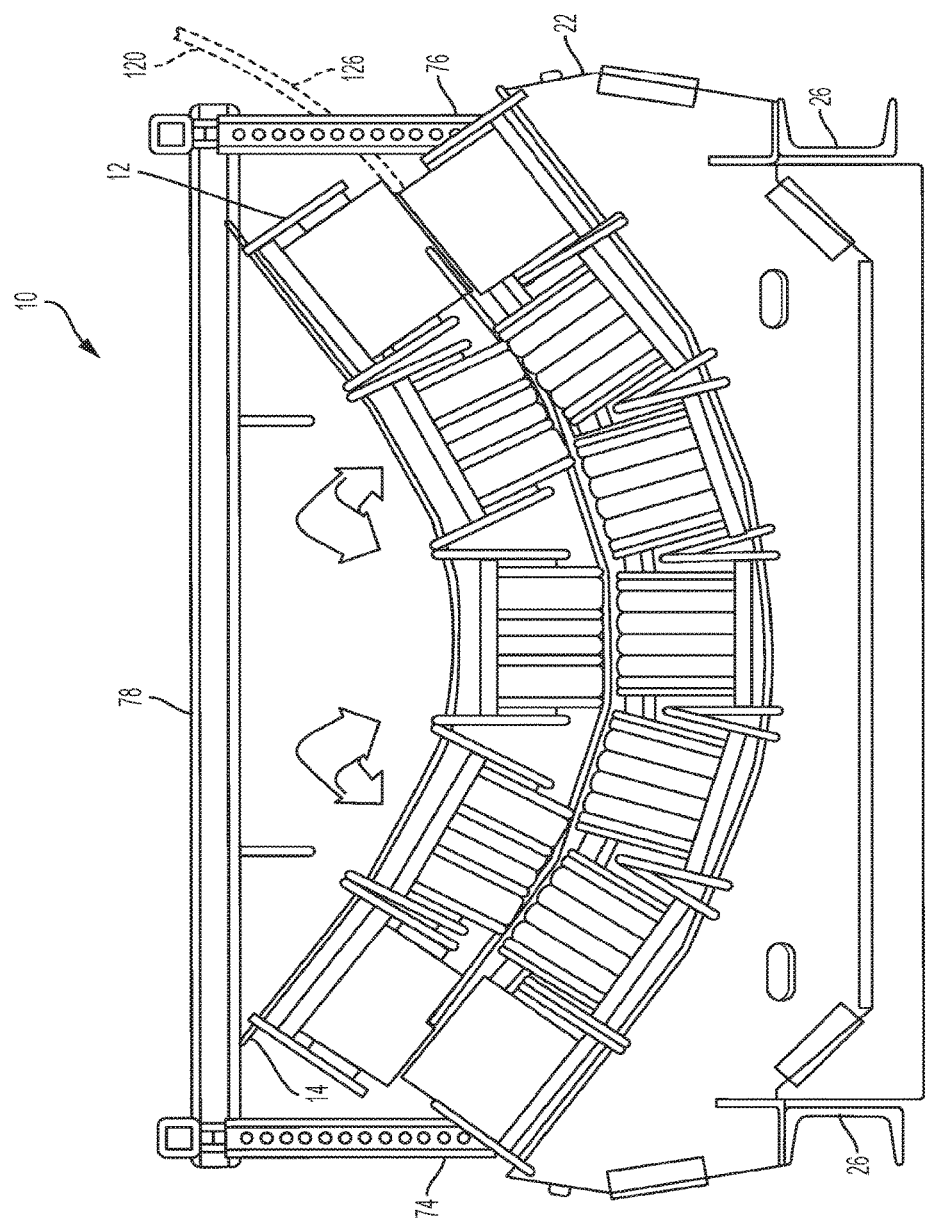
FIG. 4 is an enlarged end view of the conveyor of FIG. 1.

The impact load bed 18 can include a plurality of impact idlers 22 and a plurality of impact saddles 24, which can be arranged in series longitudinally along the conveyor belt 14. As shown in FIGS. 1-3, in one embodiment multiple impact saddles 24 can be positioned between each adjacent pair of the impact idlers 22. The impact load bed 18 can be supported by a support structure that can include a pair of mount beams 26 (FIGS. 3 and 4; one shown in each of FIGS. 1 and 2). Each of the impact idlers 22 and each of the impact saddles 24 can be attached to each one of the mount beams 26, which can be generally U-shaped beams in one embodiment, as shown in FIGS. 1 and 4. In other embodiments, support structures can include mount beams having other configurations, or other structures having any one of a variety of other configurations, to which the impact idlers 22 and the impact saddles 24 are attached.

The impact idlers 22 and the impact saddles 24 can cooperate to form a concave trough, indicated generally at 25 in FIG. 2, which can be configured to receive the conveyor belt 14. The conveyor 10 can also include a transition zone 21 (FIG. 3), which can extend longitudinally between a centerline of the tail pulley 16 and a centerline of an upstream one of the impact idlers 22. An uppermost portion of the tail pulley 16 can be higher than a lowest portion of the trough 25, such that the transition zone 21 can be a partial trough transition zone. The impact saddles 24, and at least some portions of each of the impact idlers 22, can be configured to dampen the impact that results from dropping bulk material (not shown), e.g., coal, onto the conveyor belt 14. This can minimize or prevent damage to the conveyor belt 14 as a result of dropping bulk material onto the conveyor belt 14.

Figure 5:
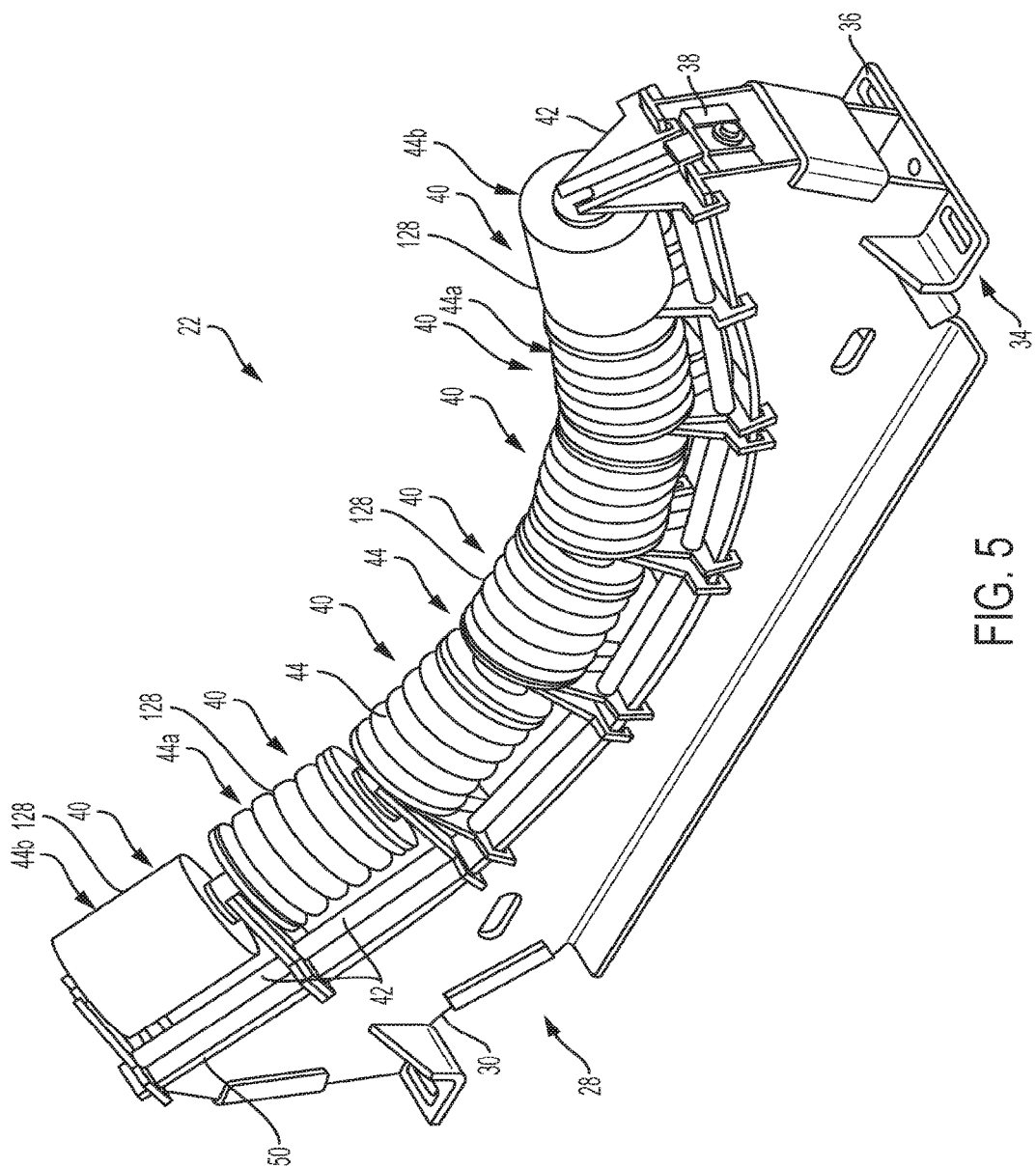
FIG. 5 is a perspective view of an impact idler of an impact load bed of the conveyor of FIG. 1, according to one embodiment.

FIG. 5 illustrates one of the impact idlers 22. Each of the impact idlers 22 can include an impact idler frame 28. The impact idler frame 28 can include a pair of side panels 30 and a pair of end structures 34. Each of the end structures 34 can include an idler foot 36, which can be attached to a respective one of the mount beams 26, and can also include an idler roll stop 38.

Each impact idler 22 can also include a plurality of roller segments 40, which can be slidably coupled with the impact idler frame 28. Each roller segment 40 can include a roller frame 42 and a roller 44 that can be rotatable relative to the roller frame 42. In one embodiment, each roller 44 can be rotatable about a centerline axis of the respective roller segment 40. The impact idler frame 28 can also include a pair of arcuate rails 50. Each of the arcuate rails 50 can be attached to a respective one of the side panels 30, e.g., each of the arcuate rails 50 can be welded to a respective one of the side panels 30. The roller frame 42 of each of the roller segments 40 can slidingly engage each of the arcuate rails 50, which can facilitate easy installation and removal of the roller segments 40. Intermediate ones of the roller segments 40, in a lateral or side-to-side direction, can include rollers 44a constructed with a rubber molded exterior formed over an inner metal shell, which provides an impact-resistant construction.

End ones of the roller segments 40, can include rollers 44b constructed of metal, or a metal alloy, e.g., stainless steel, since it can be less likely that chunks of bulk material will be dropped onto the conveyor belt 14 in areas over the end roller segments. Accordingly, the need for impact dampening in these areas may not be as great as that desired in the areas of the conveyor belt 14 over the intermediate impact roller segments. Additionally, the laterally outside end portions of the conveyor belt 14 can be subject to relatively higher tensile stresses, as a result of the transition of the conveyor belt 14 from a generally flat, free-state shape to an arcuate shape as the conveyor belt 14 travels along the impact load bed 18. Rollers made of metal, such as rollers 44b, can be more durable than rollers that include rubber molded exteriors, such as rollers 44a. As such, rollers made of metal, such as rollers 44b, can be advantageously used adjacent the lateral ends of conveyor belt 14. However, in other embodiments, the rollers 44 of each of the roller segments 40 can have an impact-resistant construction such as that described for rollers 44a.

Figure 6:
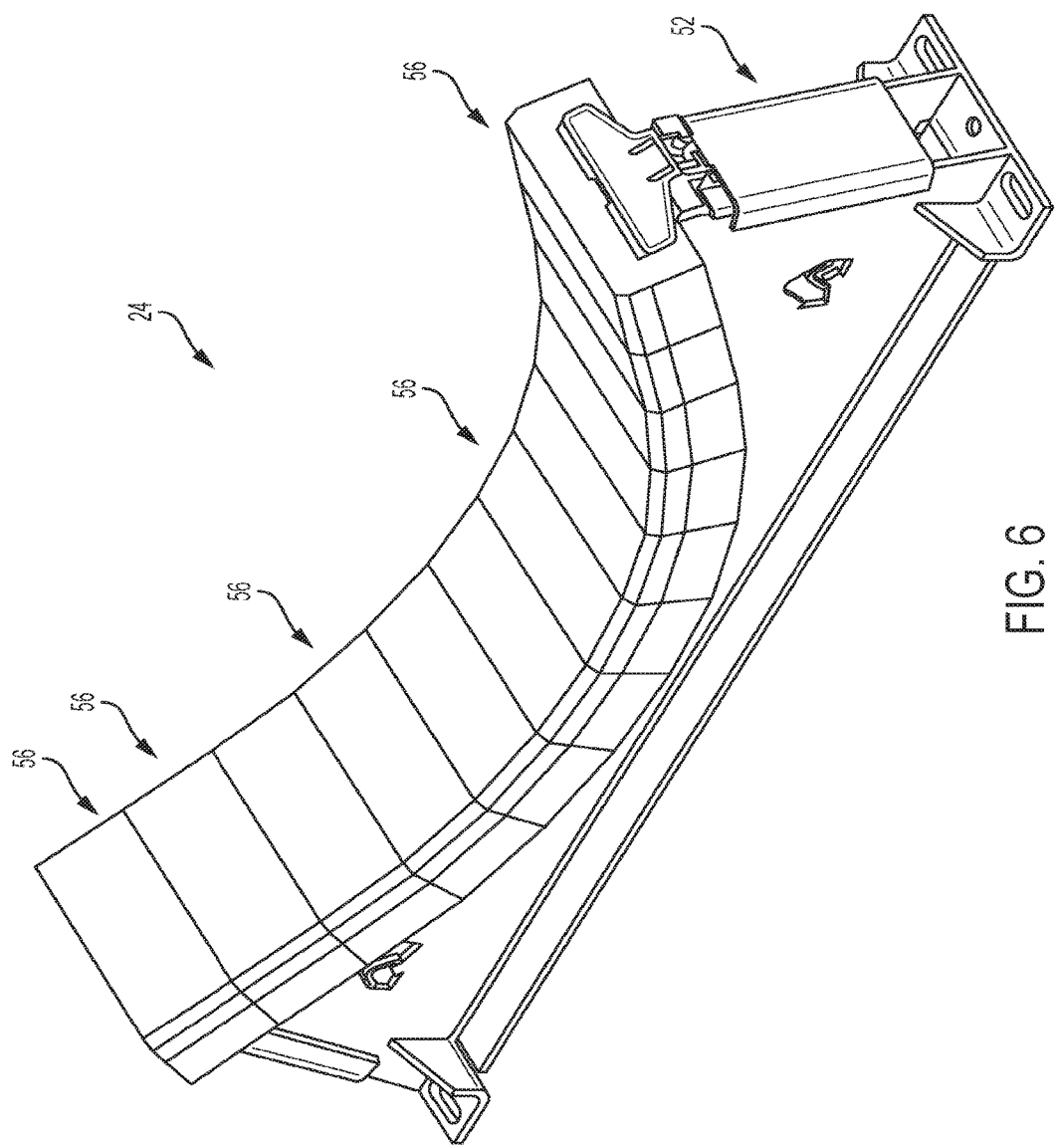
FIG. 6 is a perspective view of an impact saddle of the impact load bed of the conveyor of FIG. 1, according to one embodiment.
Figure 7:
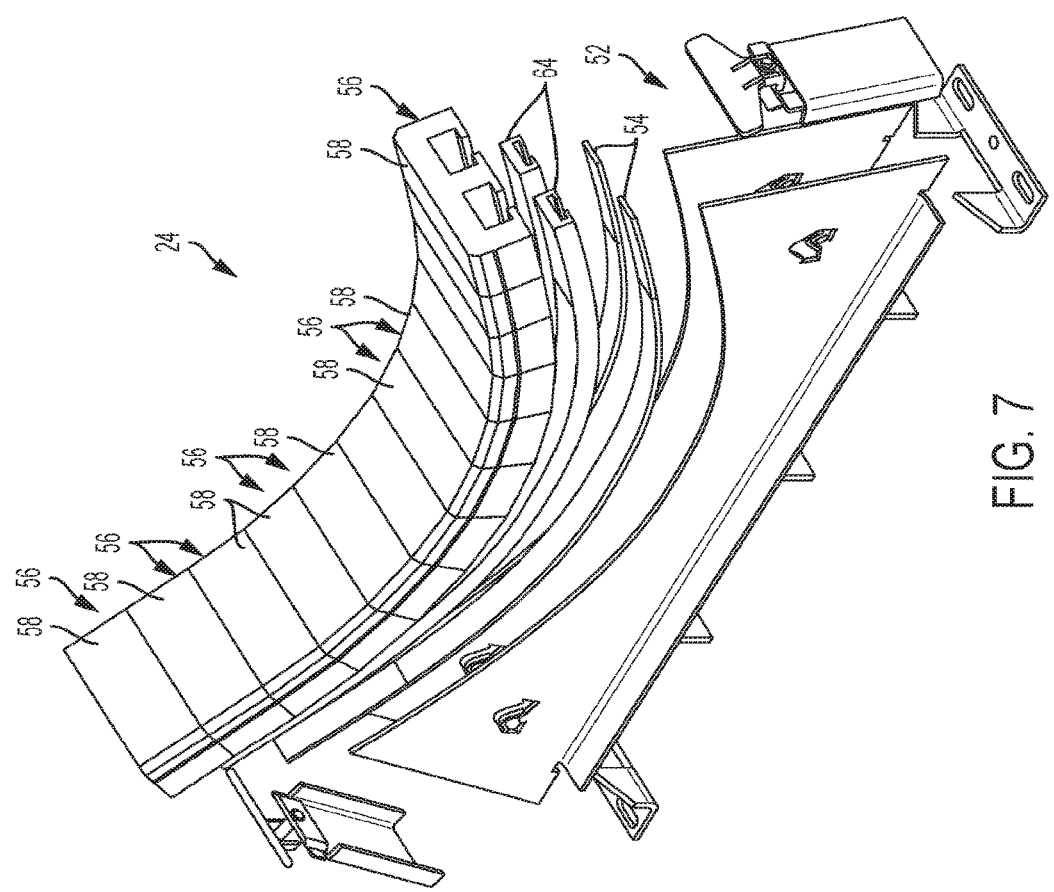
FIG. 7 is an exploded perspective view of the impact saddle of FIG. 6.
Figure 8:
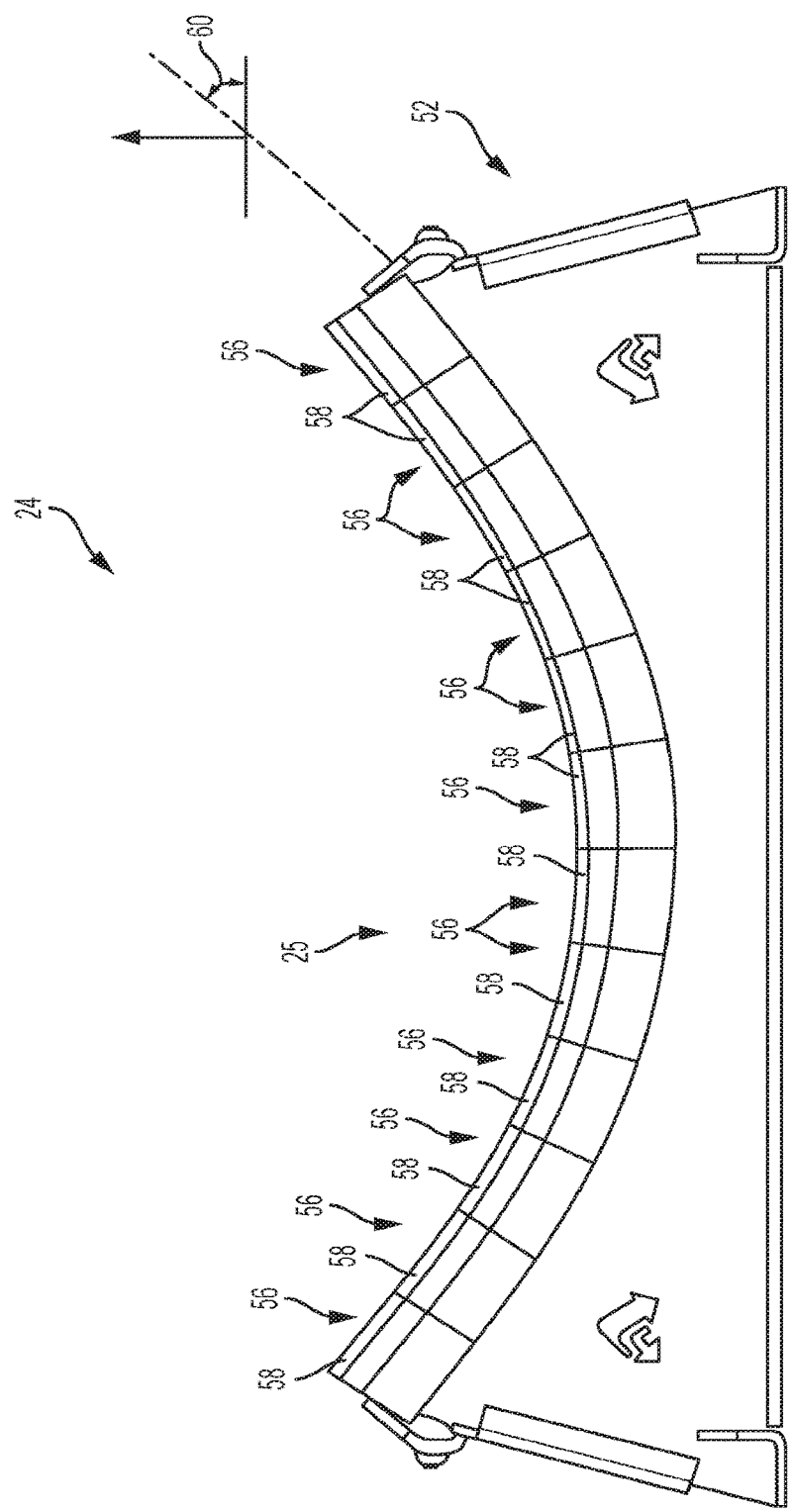
FIG. 8 is a front elevation view of the impact saddle of FIG. 6.

FIGS. 6-8 illustrate one of the impact saddles 24 of the impact load bed 18 of conveyor 10. Each of the impact saddles 24 can include an impact saddle frame 52, which can be configured the same as, or similar to, the impact idler frames 28 of the impact idlers 22. For example, each impact saddle frame 52 can include a pair of arcuate rails 54 (FIG. 7). Each of the impact saddles 24 can also include a plurality of impact segments 56 that can be configured to slidingly engage each of the arcuate rails 54. Each impact segment 56 of each impact saddle 24 can abut each laterally adjacent one of the other impact segments 56 of the respective impact saddle 24, to provide continuous support along the full width of the conveyor belt 14. The absence of gaps between laterally adjacent ones of the impact segments 56 can avoid damage to conveyor belt 14, such as rips, tears, etc., that may otherwise occur if gaps between laterally adjacent ones of the impact segments 56 would be present.

Each impact segment 56 can include a flat upper surface 58 (FIGS. 7 and 8), such that the upper surfaces 58 of the impact segments 56 of each impact saddle 24 cooperate to form a portion of the trough 25 of the impact load bed 18 of conveyor 10. The trough 25 can have a concave shape and can define a trough angle 60, as shown in FIG. 8. Each impact segment 56 can be constructed from an Ultra High Molecular Weight (UHMW) material, such that the upper surface 58 can be a relatively low friction, slick surface that can facilitate the conveyor belt 14 smoothly and efficiently gliding over the impact saddles 24. The high density impact segments 56 can substantially prevent, or prevent, debris such as tramp metals from becoming embedded in the upper surfaces 58 of the impact segments 56. Such debris can be deflected, which can avoid rips and tears in the conveyor belt 14.

Each impact saddle 24 can also include a pair of shock absorbing cushions 64 (FIG. 7), which can be constructed of a resilient material such as rubber. Each one of the shock absorbing cushions 64 can be positioned between a respective one of the arcuate rails 54 of the impact saddle frame 52 and the impact segments 56. The shock absorbing cushions 64 can help dissipate the loading impact of the bulk material upon the conveyor belt 14 through a transfer of energy. The impact saddles 24 can abut one another, in a longitudinal direction along the conveyor belt 14, or can be longitudinally spaced from one another, depending upon the expected loading of the conveyor belt 14 during operation of conveyor 10.

Conveyor 10 can also include a snub idler support structure 72 (FIGS. 1 and 2), according to one embodiment. Referring to FIGS. 1-4, the snub idler 12 can be attached to the snub idler support structure 72. In one embodiment, the snub idler 12 can be releasably attached to the snub idler support structure 72, for example, with fasteners (not shown), which can facilitate removing the snub idler 12 to replace certain components of the snub idler 12 when desired. The snub idler support structure 72 can include a first side portion 74, a second side portion 76, and a transverse portion 78 extending between, and attached to each one of, the first side portion 74 and the second side portion 76. The first side portion 74 and the second side portion 76 can be attached to, and can extend upwardly from, respective ones of the mount beams 26.

Figure 9:
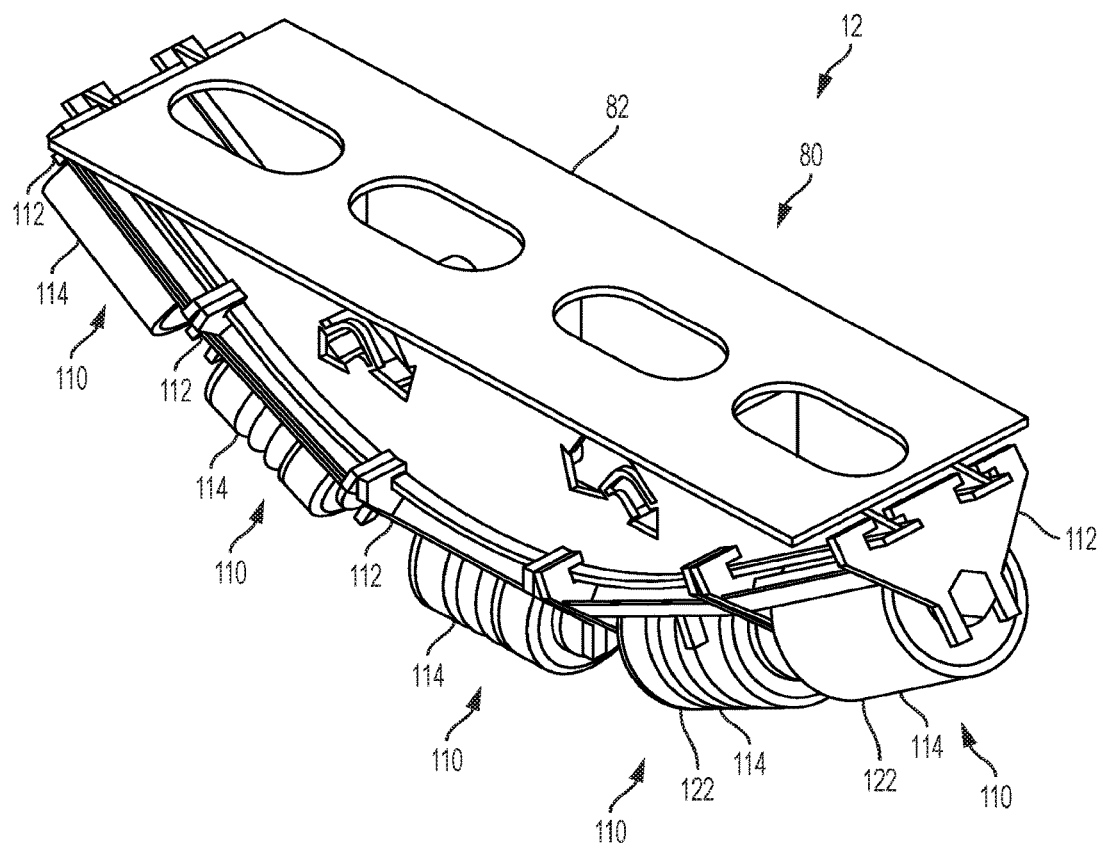
FIG. 9 is a perspective view of a snub idler of the conveyor of FIG. 1, according to one embodiment.
Figure 10:
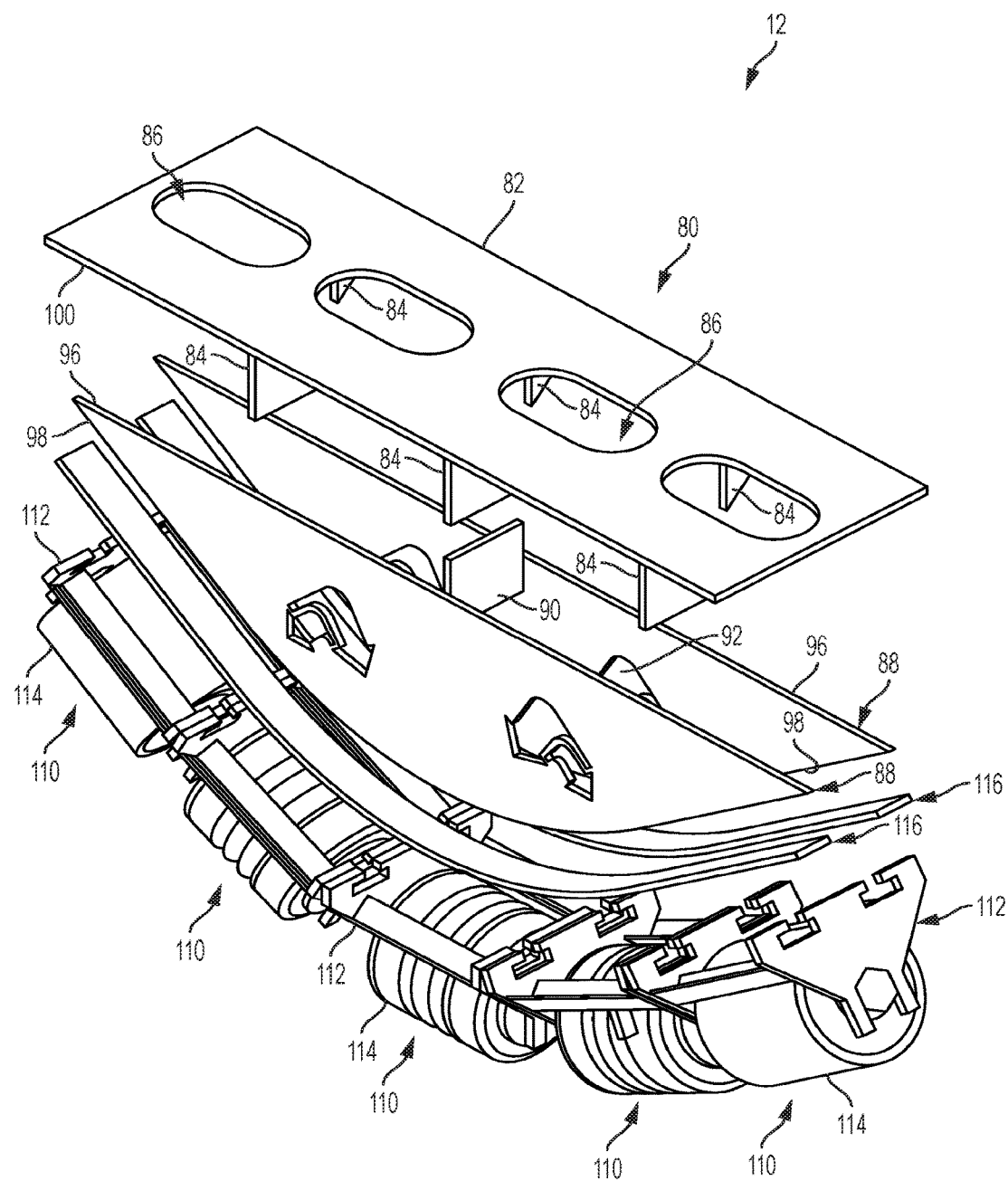
FIG. 10 is an exploded perspective view of the snub idler of FIG. 9.

Referring to FIGS. 9-11, 12A and 12B, the snub idler 12 can include a snub idler frame 80, which can be used to attach the snub idler 12 to the snub idler support structure 72. As shown in FIG. 10, the snub idler frame 80 can include a base 82 and a first plurality of base gussets 84, which can be laterally spaced from one another and can be attached to, and extend away from, a lower surface 100 of the base 82. The snub idler frame 80 can also include a second plurality of base gussets 84, which can be laterally spaced from one another and can be longitudinally spaced from the first plurality of base gussets 84 as shown in FIG. 10. The second plurality of base gussets 84 can also be attached to, and extend away from, the lower surface 100 of the base 82. In one embodiment, the first and second pluralities of the base gussets 84 can be welded to the base 82. In one embodiment, the base 82 can be planar, or substantially planar, and can define a plurality of apertures 86. The apertures 86 can result in a weight reduction, and can also reduce the buildup of bulk material on base 82, for example, that which may occur as a result of pieces of bulk material being inadvertently dropped onto the base 82. In other embodiments, the apertures 86 can be omitted.

The snub idler frame 80 can also include a plurality of side panels, for example, a pair of side panels 88 spaced from one another, as shown in FIG. 10. The snub idler frame 80 can also include one or more center gussets 90 (one shown) that can be attached, e.g., welded, to each of the side panels 88. Each of the first and second pluralities of the base gussets 84 can also be attached to each of the side panels 88, e.g., welded. The first and second pluralities of the base gussets 84, and the center gusset(s) 90 can enhance the structural integrity of the snub idler frame 80 of the snub idler 12. Each of the side panels 88 can define a plurality of apertures 92 (FIG. 11), which can facilitate lifting the snub idler 12, for example, as may be required during installation of snub idler 12. In one embodiment, the apertures 92 can be shaped to form a corporate logo. In other embodiments, the apertures 92 can be omitted.

Each of the side panels 88 can be attached, e.g., welded, to the base 82. Each of the side panels 88 can include an upper surface 96 and a lower surface 98, as shown in FIG. 10. The upper surface 96 of each side panel 88 can be in contacting engagement with the lower surface 100 of the base 82. The lower surface 98 of each of the side panels 88 can have a convex or similar shape, which can be generally complementary with the concave shape of the trough 25 defined by the impact load bed 18. Also, the side panels 88 can be constructed for compatibility with the width of the conveyor belt 14.

Figure 12A:
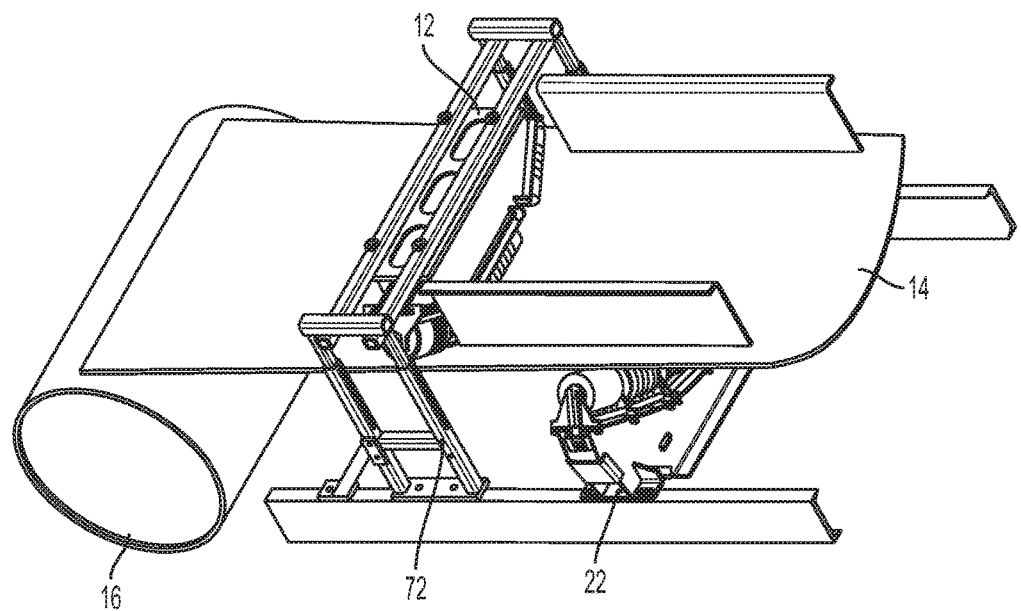
FIG. 12A is a perspective view of a conveyor according to another embodiment, which includes a snub idler according to another embodiment, with a portion of a conveyor belt, a head pulley, and a portion of a support structure of the conveyor, omitted for purposes of clarity of illustration.
Figure 12B:
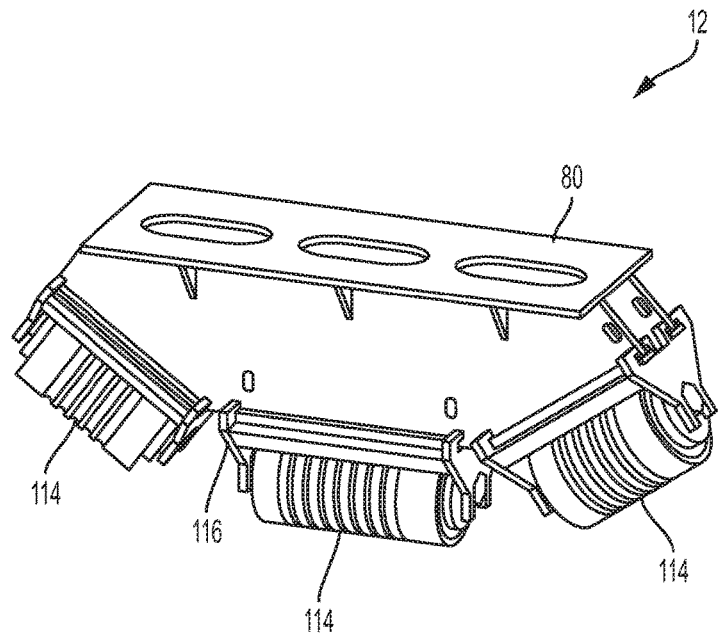
FIG. 12B is a perspective view of a snub idler of the conveyor of FIG. 12A, according to one embodiment.

The snub idler 12 can also include a plurality of roller segments 110, which can be slidably coupled with the snub idler frame 80. Each roller segment 110 can include a roller frame 112 and a roller 114 that can be rotatable relative to the roller frame 112. In one embodiment, each roller 114 can be rotatable about a centerline axis of the respective roller segment 110. The snub idler frame 80 can also include a pair of rails 116 (FIG. 10). Each of the rails 116 can be in contacting engagement with the lower surface 98 of a respective one of the side panels 88 of the snub idler frame 80, and can be attached, e.g., welded, to the respective side panel 88. Accordingly, in some embodiments each of the rails 116 can have a convex shape that can be generally complementary with the concave shape of the trough 25, as shown in FIG. 9; in other embodiments the rails 116 can have an open trapezoidal shape as shown in FIG. 12B. The roller frame 112 of each of the roller segments 110 can slidingly engage the rails 116, which can facilitate easy installation and removal of the roller segments 110. The roller segments 110 can cooperate to define a convex or open trapezoidal shape that can be generally complementary with the concave shape of the trough 25 defined by the impact load bed 18.

Figure 11:
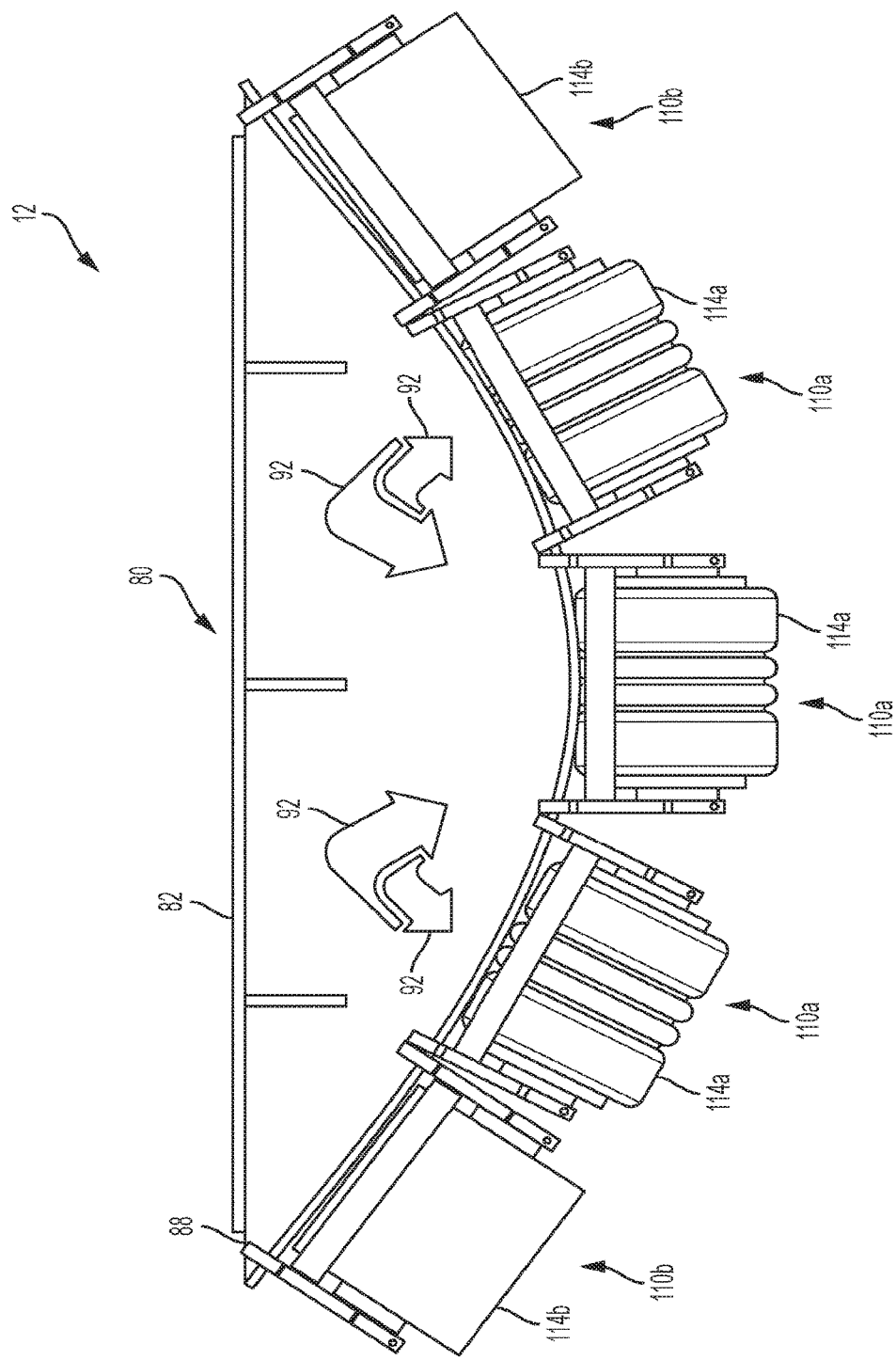
FIG. 11 is a front elevation view of the snub idler of FIG. 9.

Intermediate ones of the roller segments 110, in a lateral or side-to-side direction that is transverse to a direction of conveyance of the conveyor belt 14, which are designated 110*a* in FIG. 11, can include rollers 114*a* constructed with a rubber molded exterior formed over an inner metal shell, which provides an impact-resistant construction. End ones of the roller segments 110, designated 110*b* in FIG. 11, can include rollers 114*b* constructed of metal, or a metal alloy, e.g., stainless steel, which can be more durable than rollers 114*a*. This can be advantageous since rollers 114*b* can contact lateral end portions of the conveyor belt 14 that can have relatively higher tensile stresses due to a change in shape of the conveyor belt 14, which can be caused by the snub idler 12. However, in other embodiments (not shown), each of the end ones and each of the intermediate ones of the roller segments 110 can be constructed as described for roller segments 110*a*, or alternatively, as described for roller segments 110*b*. With other alternative embodiments (not shown), the snub idler 12 can be configured to include any other combination of roller segments constructed as described for roller segments 110*a* and 110*b*.

In one embodiment, the base 82 of the snub idler frame 80 can be releasably attached, for example, fastened, to the transverse portion 78 of the snub idler support structure 72. Alternatively, the base 82 can be permanently attached (e.g., welded) to the transverse portion 78 of the snub idler support structure 72. In other embodiments (not shown), the frame 80 can be configured for either releasable or permanent attachment to one or both of the first side portion 74 and the second side portion 76 of the snub idler support structure 72, in addition to, or in lieu of, the attachment of the base 82 to the transverse portion 78 of the snub idler support structure 72.

In still other embodiments (not shown), other mounting, or support, arrangements can be provided, for example, the snub idler 12 can be releasably attached (e.g., fastened) or permanently attached (e.g., welded) to another structure such as a chute. The snub idler 12 can extend downwardly away from the transverse portion 78 toward the conveyor belt 14, and all, or at least some, of the rollers 114 can be in contacting engagement with an upper surface 115 (FIG. 3) of the conveyor belt 14. The conveyor belt 14 can have a substantially flat shape as it leaves the tail pulley 16, which can correspond, at least substantially, to a free-state shape of the conveyor belt 14. In order for the full width of the conveyor belt 14 to be supported by the impact idlers 22 and the impact saddles 24 as the conveyor belt 14 travels through the trough 25 defined by the impact load bed 18, it is necessary for the conveyor belt 14 to transition from this substantially flat shape to a concave shape, which can be the same as, or substantially the same as, the concave shape of trough 25. This transition can occur as the conveyor belt 14 travels through the transition zone 21. In particular, this transition in shape of the conveyor belt 14 can be required so that a lower surface 130 (FIG. 2) of the conveyor belt 14 can be in contacting engagement with the rollers 44 of at least some of the roller segments 40 of each of the impact idlers 22, and with the flat upper surfaces 58 of at least some of the impact segments 56 of each of the impact saddles 24, as the conveyor belt 14 travels through the trough 25.

The configuration and position of the snub idler 12 can position the conveyor belt 14 within the trough 25 and can shape the conveyor belt 14 to conform with the concave shape of the trough 25. Also, the snub idler 12 can eliminate, or substantially eliminate, upward movement of the conveyor belt 14 as it moves through the trough 25 defined by the impact load bed 18. The snub idler 12 can be positioned at any position longitudinally between the tail pulley 16 and the impact load bed 18 of conveyor 10. In one embodiment, the snub idler 12 can be positioned in close proximity to an upstream one of the impact idlers 22, as shown in FIGS. 1-3. A longitudinal spacing between the tail pulley 16 and the roller segments 110 of the snub idler 12, i.e., a distance d1 (FIG. 3) measured along the length of the conveyor belt 14, can be substantially larger than a longitudinal spacing between the roller segments 110 of the snub idler 12 and the upstream one of the impact idlers 22, i.e., a distance d2 (FIG. 3) measured along the length of the conveyor belt 14. This can permit the conveyor belt 14 to "relax" to reduce the tensile stress in the conveyor belt 14 as a result of the change in shape of the conveyor belt 14. Furthermore, the close proximity of the snub idler 12 to the impact load bed 18, for example, the close proximity of the snub idler 12 to the upstream one of the impact idlers 22, can facilitate transitioning the shape of the conveyor belt 14 as it enters the trough 25 defined by the impact load bed 18, which can be desirable, as compared to positioning the snub idler 12 at a location farther away from the impact load bed 18 and closer to the tail pulley 16.

The roller 114 of each roller segment 110 of the snub idler 12 can be arranged in a straight line configuration, i.e., a centerline axis of each roller segment 110, about which the roller 114 rotates, can be a straight line. However, the rollers 114 of the roller segments 110 can cooperate to define a convex shape, which can be generally complementary with the concave shape of the trough 25 defined by the impact load bed 18. The convex shape defined by the rollers 114 can result, at least in part, from the convex shape of each of the rails 116 of the snub idler frame 80 and the sliding engagement of the roller segments 110 with each of the rails 116. The convex shape defined by the rollers 114 can be illustrated generally by a profile 120 (shown partially in FIG. 4) that can be tangent to a lowermost portion of an outer surface 122 (FIG. 9) of each roller 114, which can be in contact with the upper surface 115 (FIG. 3) of the conveyor belt 14. The rollers 44 of the roller segments 40 of each of the impact idlers 22 can cooperate to define a concave shape of the respective impact idler 22 that can be illustrated generally by a profile 126 (shown partially in FIG. 4 for one of the impact idlers 22) that can be tangent to an uppermost portion of an outer surface 128 (FIG. 5) of each roller 44. The uppermost portion of the outer surface 128 of each of the rollers 44, of each impact idler 22, can define respective portions of the trough 25 and can be in contact with the lower surface 130 (FIG. 2) of the conveyor belt 14. The shape of the profile 120 can be generally complementary with the concave shape of the trough 25. For example, the shape of the profile 120 can be generally complementary with the shape of the profile 126.

The longitudinal and vertical positions of the snub idler 12, in combination with the configuration of the roller segments 110 of the snub idler 12, can cause the conveyor belt 14 to be shaped and positioned such that the conveyor belt 14 is in contacting engagement with the impact idlers 22 and the impact saddles 24 as the conveyor belt 14 travels through the trough 25 defined by the impact load bed 18. In alternate embodiments (not shown), the conveyor 10 can include multiple snub idlers 12 positioned between the tail pulley 16 and the impact load bed 18, and longitudinally spaced from one another. The snub idlers 12 can cooperate to gradually transition the conveyor belt 14 from a flat shape to the concave shape of trough 25. For purposes of illustration, and not of limitation, the trough 25 may have a trough angle 60 of thirty five degrees. Again, for purposes of illustration, and not of limitation, in one embodiment (not shown), the conveyor 10 can include three snub idlers 12, with an upstream one of the snub idlers 12, closest to the tail pulley 16, configured to transition the conveyor belt 14 from a flat shape to a shape compatible with a trough angle of fifteen degrees. An intermediate one of the snub idlers 12 could further transition the shape of the conveyor belt 14 to a shape compatible with a trough angle of twenty five degrees. A downstream one of the snub idlers 12, closest to the impact load bed 18, could be configured to further transition the conveyor belt 14 to a shape compatible with the thirty five degree trough angle 60 of trough 25. In another alternative embodiment (not shown), the conveyor 10 can include a single snub idler 12 and a first, or upstream one, of the impact idlers 22 can be aligned longitudinally with the snub idler 12, i.e., below the snub idler 12 and in contacting engagement with the lower surface 130 of the conveyor belt 14.

According to one embodiment, a method of positioning and shaping a conveyor belt can include configuring a snub idler (e.g., 12) to define a convex shape generally complementary with a concave shape of a trough (e.g., 25) defined by an impact load bed (e.g., 18) of a conveyor (e.g., 10). The method can also include positioning the snub idler (e.g., 12) longitudinally between a tail pulley (e.g., 16) of the conveyor (e.g., 10) and the impact load bed (e.g., 18). In one embodiment, the snub idler (e.g., 12) can be positioned in close proximity to the impact load bed (e.g., 18). The method can also include supporting the snub idler (e.g., 12) with a snub idler support structure (e.g., 72), such that the roller (e.g., 114) of at least some of the roller segments (e.g., 110) of the snub idler (e.g., 12) contact an upper surface (e.g., 115) of the conveyor belt (e.g., 14), and force the conveyor belt (e.g., 14) down into the trough (e.g., 25), with a lower surface (e.g., 130) of the conveyor belt (e.g., 14) contacting impact idlers (e.g., 22) and impact saddles (e.g., 24) of the impact load bed (e.g., 18) of the conveyor (e.g., 10).

Use of snub idlers (e.g., snub idler 12) can result in various advantages, in both field retrofit of existing conveyors, and in the design and production of new conveyors. For example, incorporation of a snub idler (e.g., 12) in a partial trough transition zone (e.g., 21) of a conveyor (e.g., 10) can force a conveyor belt (e.g., 14) of the conveyor (e.g., 10) down into a trough (e.g., 25) defined by an impact load bed (e.g., 18) of the conveyor (e.g., 10). This can result in the conveyor belt (e.g., 14) conforming with the concave shape of the trough (e.g., 25), which can facilitate engagement of a lower surface (e.g., 130) of the conveyor belt (e.g., 14) with impact idlers (e.g., 22) and impact saddles (e.g., 24) of the impact load bed (e.g., 18) of the conveyor (e.g., 10), as it travels through the trough (e.g., 25). Also, upward movement of the conveyor belt (e.g., 14) away from the impact load bed (e.g., 18) can be substantially prevented, or prevented. This can be desirable as a conveyor belt of some conventional conveyors having a partial trough transition zone may be likely to have upward movement, away from the impact load bed. For each such conventional conveyor, this upward movement of the conveyor belt can cause damage and excess wear to the seals attached to the lower ends of side skirt boards of a chute enclosing the conveyor belt. This can result in the undesirable escape of dust and fine particles of bulk material (e.g., coal) being transported by the conveyor belt into the surrounding atmosphere.

In addition to the escape of fine particles, under some circumstances, the damage and excess wear of the seals may cause larger lumps of bulk material (e.g., coal) to become trapped beneath the side skirt boards of a chute, and/or beneath side skirt boards at other locations that are not attached to the chute. This can result in damage to a conveyor belt of a conventional conveyor, which can be very expensive to replace. The use of the snub idler (e.g., 12) can prevent, or substantially prevent, the damage and excess wear to the seals attached to the lower ends of the side skirt boards of a chute, and to seals attached to the lower ends of side skirt boards positioned at other locations on the conveyor, and thereby can prevent, or substantially prevent, the resulting problems associated with the damage and excess wear of the seals. This can facilitate compliance with state and federal regulations regarding the emission of dust and fine particles of bulk material into the atmosphere. Additionally, the cost to repair the seals attached to the side skirt boards and/or to replace the conveyor belt, and possibly more significantly, the cost of lost production due to downtime, can be avoided.

The incorporation of a snub idler (e.g., 12) at the design stage of a conveyor (e.g., 10) can result in another advantage. Due to the ability of the snub idler (e.g., 12) to prevent, or substantially prevent, the damage that can be caused by a partial trough transition zone of a conventional conveyor, a conveyor (e.g., 10) can be designed to include a partial trough transition zone (e.g., 21), and a snub idler (e.g., 12) positioned in the partial trough transition zone (e.g., 21), in lieu of a full trough transition zone (not shown). The design of a conveyor (e.g., 10) incorporating a partial trough transition zone (e.g., 21) can be desirable as it can require less space and can lower the tension on the conveyor belt (e.g., 14). A typical full trough transition zone of a conventional conveyor can require a distance of about 2.5 to 4 times the width of the conveyor belt to transition from the flat configuration of the conveyor belt at the tail pulley to the full trough angle at the upstream, or first full trough, impact idler without placing excessive tension on the impact idlers. Alternatively, a partial trough transition zone (e.g., 21) can require a distance of about 1 to 2 times the width of the conveyor belt (e.g., 14) to transition from the flat configuration of the conveyor belt (e.g., 14) at the tail pulley (e.g., 16) to the full trough angle (e.g., 60) without placing excessive tension on the impact idlers (e.g., 22). If a conveyor were to incorporate a full trough transition zone having a length less than the typical recommended length, the conveyor may have to incorporate heavier duty impact idlers to withstand the tension. As creating more space (e.g., digging a larger tunnel in a mine), or buying heavier duty impact idlers can be a significant cost increase, a conveyor (e.g., 10) incorporating a snub idler (e.g., 12) positioned in a partial trough transition zone (e.g., 21) can result in a significant cost savings for the consumer, or conveyor operator, as compared to the cost of using a conventional conveyor incorporating a full trough transition zone having the typical recommended length or a full trough transition zone having a smaller length and using heavier duty idlers.

Snub idlers (e.g., 12) can be advantageously used in association with impact load beds of conveyors that are configured differently than the impact load bed 18 of conveyor 10, for example, with impact load beds having different numbers of impact idlers and/or impact saddles, with impact idlers only, or with impact saddles only, or with conveyors having any one of a variety of other configurations.

While the forms of apparatus herein described constitute preferred embodiments of this invention, it is to be understood that the invention is not limited to these precise forms of apparatus, and that changes may be made therein without departing from the scope of the invention which is defined in the appended claims.

I claim:

1. A snub idler for a conveyor comprising:
   a. a plurality of rollers, and
   b. a frame comprising means to support the plurality of rollers in a convex or open trapezoidal shape, wherein the means to support the plurality of rollers in a convex or open trapezoidal shape comprises a pair of arcuate rails, each of the arcuate rails having a convex or open trapezoidal shape, and
   wherein the frame further comprises a base and a pair of side panels, each side panel having an upper surface attachable to the base and a lower surface having a convex shape, and wherein each arcuate rail is attached to one of the side panels, respectively, in contacting engagement with the lower surface of the side panel.

2. The snub idler of claim 1, wherein the frame further comprises a plurality of gussets affixed to a lower surface of the base and opposing interior surfaces of the side panels.

3. The snub idler of claim 1, wherein the base is substantially planar, and defines a plurality of apertures.

4. The snub idler of claim 1, wherein each of the plurality of rollers is rotatably supported by a roller frame, wherein the roller frames are slidably coupled with the arcuate rails.

5. A snub idler for a conveyor comprising
   a. a plurality of rollers, and
   b. a frame comprising means to support the plurality of rollers in a convex or open trapezoidal shape, wherein some of the rollers are constructed with a rubber molded exterior formed over an inner metal shell, and other rollers comprise a metal exterior.

6. A snub idler for a conveyor comprising:
   a. a plurality of rollers, and
   b. a frame comprising means to support the plurality of rollers in a convex or open trapezoidal shape; and
   c. a support structure coupled with the frame, the support structure having first and second side portions and a transverse portion extending between the first and second side portions, and wherein the support structure when coupled with the frame and rollers is mountable at its side portions on and upward from a mounting beam of a conveyor so that the rollers are supported above a belt of the conveyor.

7. The snub idler of claim 6, wherein the frame is attached to the transverse portion and the side portions of the support structure.

8. A conveyor comprising:
   a. a tail pulley
   b. an impact load bed defining a trough having a concave shape,
   c. one or more snub idlers positioned between the tail pulley and the impact load bed, the snub idler comprising a plurality of rollers and a frame comprising means to support the plurality of rollers in a convex shape generally complementary with the concave shape of the trough,
   d. a belt having an upper surface, the belt traversing the tail pulley, the snub idler and the impact load bed, and
   e. a conveyor support structure, wherein the tail pulley and the impact load bed are supported by the conveyor support structure below the belt, and the snub idler is supported by the conveyor support structure.

9. The conveyor of claim 8, wherein the means to support the plurality of rollers in a convex shape comprises a pair of arcuate rails, each of the arcuate rails having a convex shape that is generally complementary with the concave shape of the trough.

10. The conveyor of claim 9, wherein the frame further comprises a base and a pair of side panels, each side panel having an upper surface attachable to the base and a lower surface having a convex shape, and wherein each arcuate rail is attached to one of the side panels, respectively, in contacting engagement with the lower surface of the side panel.

11. The conveyor of claim 10, wherein the impact load bed comprises one or more impact idlers and one or more impact saddles.

12. The conveyor of claim 9, wherein each of the plurality of rollers is rotatably supported by a roller frame, and wherein each roller frame is slidably coupled with the arcuate rails.

13. The conveyor of claim 8, further comprising a support structure coupled with the frame, the support structure having first and second side portions and a transverse portion extending between the first and second side portions, wherein the frame is attached to the transverse portion and the side portions of the support structure, and wherein the support structure when coupled with the snub idler is mountable at its side portions on and upward from a mounting beam of the conveyor so that the rollers of the snub idler are supported above the belt.

14. The conveyor of claim 8, wherein the one or more idlers comprise at least three idlers, the idlers varying in trough angle, with each idler trough angle being less than or equal to a trough angle of the trough.

15. A method of positioning and shaping a conveyor belt comprising:
   a. configuring a snub idler comprising a plurality of roller segments, each roller segment having a roller, the rollers defining a convex shape generally complementary with a concave shape of a trough defined by an impact load bed of a conveyor,
   b. positioning the snub idler longitudinally between a tail pulley of the conveyor and the impact load bed, and
   c. supporting the snub idler with a snub idler support structure such that the roller of at least some of the roller segments of the snub idler is in contact with an upper surface of the conveyor belt and forces the conveyor belt down into the trough, with a lower surface of the conveyor belt contacting the impact load bed.

16. The method of claim 15, wherein
   a. the snub idler further comprises a frame having a pair of side panels, each side panel having a lower surface with a convex shape, and a pair of arcuate rails, each of the arcuate rails having a convex shape that is generally complementary with the concave shape of the trough, wherein each arcuate rail is attached to one of the side panels, respectively, in contacting engagement with the lower surface of the side panel, and
   b. each of the plurality of roller segments comprises a roller frame rotatably supporting the roller, wherein the roller frames are slidably coupled with the arcuate rails.

17. The method of claim 15, wherein the distance between the tail pulley and the snub idler in the configured arrangement is greater than the distance between the snub idler and the impact load bed.

18. The method of claim 15, wherein the impact load bed comprises one or more impact idlers and one or more impact saddles.

* * * * *